United States Patent
Morrill

[15] 3,664,301
[45] May 23, 1972

[54] AQUARIUM

[72] Inventor: Ralph C. Morrill, 950 Benham Street, Hamden, Conn. 06514

[22] Filed: Oct. 12, 1970

[21] Appl. No.: 79,891

[52] U.S. Cl. ................................................................ 119/5
[51] Int. Cl. ........................................................... A01k 63/00
[58] Field of Search ................................................ 119/2, 3, 5

[56] References Cited

UNITED STATES PATENTS 2,879,742  3/1959  Morrill........................................119/5
3,324,573  6/1967  Lavallee.....................................119/5 X

*Primary Examiner*—Aldrich F. Medbery
*Attorney*—Delio and Montgomery

[57] ABSTRACT

In an aquarium tank having a concave mirror as at least a portion of its rear wall, the distortion of images of fish and other objects in the water of the aquarium is prevented by positioning the front, transparent wall such that objects in the tank are confined between the principal focal point of the mirror and the surface of the mirror. The strength of the aquarium and its resistance to soiling and corrosion is improved by providing corner posts of extruded aluminum alloy, and bottom and top members of plastic.

10 Claims, 7 Drawing Figures

PATENTED MAY 23 1972  3,664,301
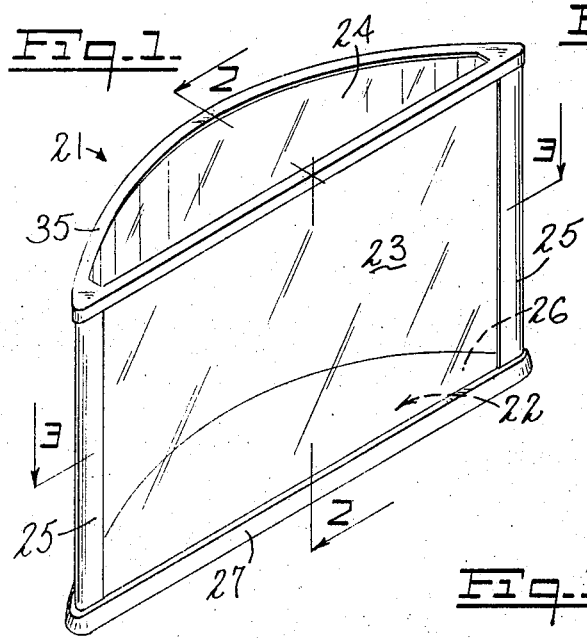
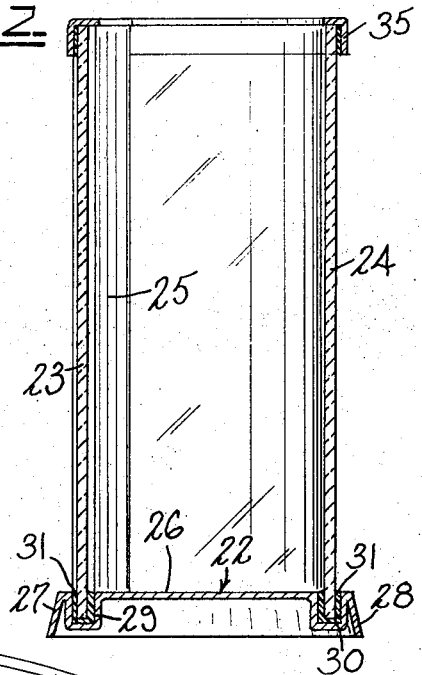
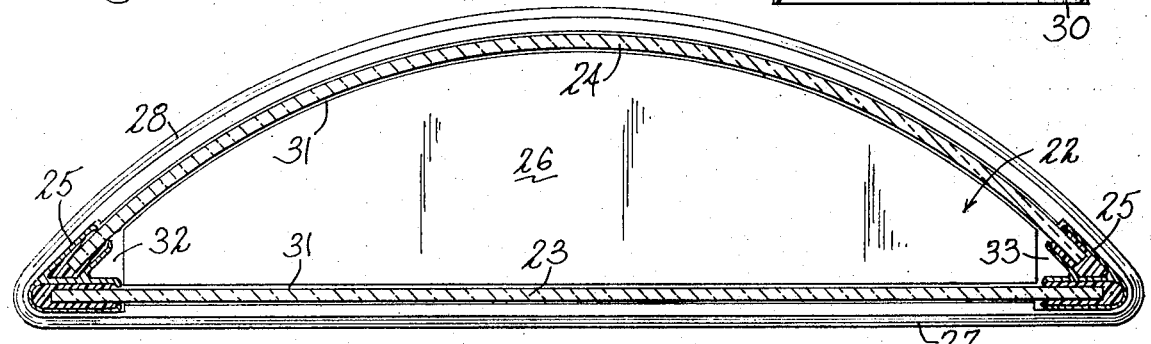
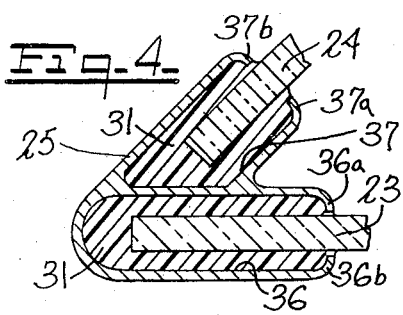
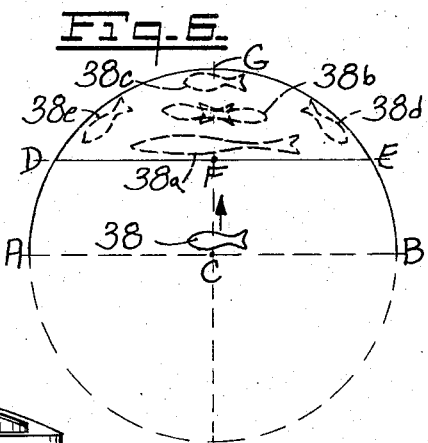
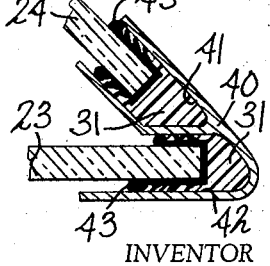
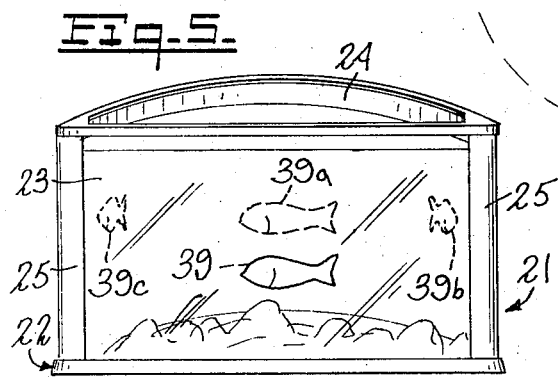
INVENTOR
Ralph C. Morrill
BY De Lio and Montgomery
ATTORNEYS

AQUARIUM

BACKGROUND OF THE INVENTION

This invention relates to an aquarium tank for the viewing of aquatic life and other objects.

Applicant's U. S. Pat. No. 2,879,742 issued Mar. 31, 1959 describes an aquarium tank having a cylindrical back member providing a mirrored surface on its concave side, and in which the principal focal point of the mirror is back of the front member of the aquarium, that is, between the front member and the mirrored back wall. The front member preferably is flat and transparent and is connected to the back member through end edges formed of metallic framing material.

While the aquarium tank of the patent provides many useful and desirable effects, including the multiplication of the images of objects within the aquarium, minimization of recognizable reflections of objects outside the aquarium, and simulation of the appearance of aquatic life as if the viewer were actually within the confines of the tank, the aquarium unduly distorts the reflected images of objects present in the tank. The distortion is particularly evident with respect to moving objects such as fish, to the point of discomforture to the eyes of the viewer.

Furthermore, although the aquarium of U. S. Pat. No. 2,879,742 is easily disassembled for the purpose of cleaning and repairing, it has been found that this feature, by reason of the construction required, promotes collection of soil in the corners of the tank and requires expensive construction materials in order to minimize corrosion.

Additionally, when the tank of the patent is disassembled, the water tight sealing means such as channel gaskets and water tight adhesive, must often be replaced when reassembling the tank, thus contributing to maintenance expense and inconvenience.

SUMMARY AND OBJECTS OF THE INVENTION

Briefly indicated, the aquarium tank of this invention retains substantially all of the visual advantages of the aquarium of the earlier patent but eliminates the undue and discomforting distortion of objects within the tank by positioning the front member of the tank such that objects in the tank are confined to the area between the principal focal point of the concave mirror, which forms at least a portion of the back member or wall, and the surface of the mirror. Preferably, the principal focal point is substantially coincident with the front member of the aquarium, that is, is in at least one of the planes comprising the front member. Other features include permanent connection of bottom, top and end members to the back and front members with water tight sealing material, and the use of corrosion-and-soil-resistant materials for the bottom and end members.

Accordingly, an object of the invention is to provide an improvement in the aquarium tank of U. S. Pat. No. 2,879,742 by eliminating the undue and visually discomforting distortions of images of objects submerged in the tank, but with retention of substantially all other visual advantages of the prior invention.

Still another object is to provide an aquarium tank of sturdy construction and which is resistant to corrosion and collection of soil.

Still other objects, features and advantages of the invention will in part be obvious and in part will be apparent from the specification.

The invention accordingly comprises an article of manufacture possessing the features, properties and the relation of elements which will be exemplified in the aquarium tank hereinafter described, and the scope of the invention will be indicated in the claims.

DETAILED DESCRIPTION

For a fuller understanding of the nature and objects of the invention, reference is had to the following description taken in connection with the accompanying drawing, in which:

FIG. 1 is a perspective view of an aquarium tank of the invention;

FIG. 2 is a somewhat enlarged vertical section along the line 2—2 of FIG. 1;

FIG. 3 is a further enlarged horizontal section along the line 3—3 of FIG. 1;

FIG. 4 is an enlargement of the left corner of the section of FIG. 3;

FIG. 5 is a partially perspective, frontal elevation of an aquarium tank of the invention;

FIg. 6 is a diagrammatic view from above an aquarium tank embodying features of the invention; and FIG. 7 is an enlarged, partially fragmentary, longitudinal section of another embodiment of corner post construction of an aquarium of the invention.

With reference to FIGS. 1-3, an aquarium tank 21 of the invention comprises a bottom member 22, a front member 23, a back member 24 and a pair of end members 25. Front member 23 preferably is substantially uniplanar and transparent over substantially its entire area, such as plate glass. However, the front member may have one or more portions of its area opaque or translucent so as to provide viewing windows at one or more positions. The opacity or translucence may be provided by any suitable means including controlled manufacture of the front member itself, coating as by painting, or by suitable construction of the end members 25 so as to reduce or vary the viewing area. Likewise, the front member 23 may be other than flat, and may comprise a multiplanar surface, or it may be spherical, such as a concave or convex surface.

The back member 24 is spherically concave towards the interior of the tank and has a mirror surface. The back member 24 thus may be constructed of curved transparent glass, on the convex side of which is deposited in a known manner a layer of silver in order to provide a highly reflective concave mirror. A wide variety of other materials and combinations thereof may also be suitable in providing the concave mirror. For example, the back member may be a curved piece of plastic coated in a manner similar to glass, or the back member may be an opaque material carrying a highly reflective foil or chrome plating. In any of these constructions the principal focal point of the concave mirror is in a plane which is outside of the front member 23 or coincident with the plane of the front member which is closest to the surface of the mirror. These relationships will be explained further with reference to FIG. 6.

The bottom member 22, preferably of the shape of an inverted saucer, serves as a support for the entire aquarium tank structure and preferably is grooved, as indicated by grooves 29 and 30 in FIG. 2, to receive front member 23 and back member 24. Rims 27 and 28 of bottom member 22 provide elevation of grooves 29 and 30 above the surface upon which the aquarium tank rests in order to prevent contact of the lower edges of grooves 29 and 30 with the resting surface. The upper surface 26 of the bottom member 22, which normally will be in contact with the water of the tank, also is elevated above the surface upon which the tank rests in order to reduce the transmittal of vibrations from the resting surface to the contents of the tank. The bottom member 22 preferably is molded in one piece from heavy-duty plastic but may be fabricated of other suitable water impervious material such as slate.

The pair of end members 25 preferably are each constructed of aluminum alloy extrudate in the form of corner posts having grooved surfaces for receiving the vertical edges of the back and front members. End members 25 in turn are affixed with a water sealant adhesive 31 in grooves 32 and 33 provided in bottom member 22 at the corners thereof. The end members 25, as shown in FIG. 4, are constructed to provide channels or grooves 36 and 37 for receiving the outer edges of front member 23 and back member 24, respectively. It will also be noted that the outer edges of channels or grooves 36 and 37 are turned inwardly of front and back members 23 and 24, as edges 36a, 36b, 37a and 37b, so as to provide partial closure of grooves 36 and 37.

In the preferred method of construction of the aquarium tank of the invention, a suitable sealant material 31 is first packed in grooves 36 and 37 and thereafter, at a predetermined stage of curing of the sealant, the front and back members 23 and 24 are inserted in grooves 36 and 37 such that the sealant adheres to the edges of the front and back members and in due course provides a water-tight closure therewith. A large variety of materials are commercially available for these purposes. It is preferred to use a waterproofing material which remains sufficiently pliable during construction of the aquarium tank for ease of insertion of the front and back members, and affixing to bottom member 22.

Alternatively, and less preferably, end members such as the end posts 40 shown in the horizontal section of FIG. 7 may be employed. Similar to the end members of FIG. 4, channels or grooves 41 and 42 are provided in end posts 40 for insertion of front and back members 23 and 24. However, in the embodiment of FIG. 7, the edges of front and back members 23 and 24 are first provided with a U-shaped, serrated, sealing gasket 43 along substantially the entire vertical edges of the front and back members. The water sealing adhesive 31 is then inserted in grooves 41 and 42 followed by insertion of the gasketed edges of front and back members 23 and 24. The serrated edges of the gaskets 43 then, in combination with adhesive 31, seal the edges of the front and back members against the insides of grooves 41 and 42.

For added strength, a top member 35, grooved in a manner similar to that of bottom member 22, may be provided as shown in FIGS. 1 and 2. However, the top member 35 is optional since, aside from considerations of appearance, a beveling or smoothing of the upper edges of the front and back members may be sufficient. The top member 35 is conveniently molded from plastic in a single piece, similar to bottom member 22.

The visual improvements provided by the aquarium of the invention will be evident from a consideration of FIG. 6 which is a schematic top view of the present aquarium and the aquarium tank of U. S. Pat. No. 2,879,742. As indicated in the patent, the cross section of the concavely mirrored back member of the prior aquarium is a semi (half) cylinder comprising the segment AGB of FIG. 6, and the patent requires that its focal point be back of the front member, that is, between the front member represented by line ACB and the mirrored back member represented by line AGB. As is well known, the principal focus of a spherical mirror is on the principal axis of the mirror one half the distance between the center of curvature and the mirror surface. With reference to FIG. 6, the quarter cylinder DGE represents the concavely mirrored back member 24 of the present invention. It will then be evident that the principal axis of concave mirror AGB or DGE is the line GC passing through the center of curvature C and the principal focal point is the point F.

The present invention is based on the surprising discovery that if the principal focal point F is arranged to fall in the plane of the front member DE, or outside front member DE, the image distortions to which the prior tank is subject are eliminated. In practice, this result is achieved by constructing the tank such that the front member confines objects in the tank within the area bounded by the plane of the focal point and the surface of the mirror. The effect of location of an object in FIG. 6 such as a fish 38, relative to the focal point F, will make these considerations clear, where this explanation is in terms of viewing the fish 38 from a position in front of front members ACB or DFE rather than from a viewpoint from above the tank, although the images in FIG. 6 seem to be viewed from above the tanks.

When thus viewed from the front of the tank, the fish 38, when close to and centered relative to the front line ACB of the tank of the patent, provides an image 38a which is elongated and distorted in appearance. As the fish 38 moves towards focal point F in the direction of the arrow, its reflected image changes to the form represented as 38b, that is, a two-headed image which is beginning to split into two separate images. Finally, as fish 38 moves in the direction of the arrow to a point coinciding with focal point F, the three images 38c, 38d and 38e appear, each of which is a total, substantially undistorted, image of the fish. The three images remain substantially intact for any position of fish 38 between points F and G. It thus becomes apparent that in order to eliminate distorted images, such as images 38a and 38b, the objects submerged in the aquarium tank such as fish 38, must be confined to the region defined by quarter cylinder DGE. It will also be evident that concave mirror DGE may be less than the quarter cylinder shown in FIG. 6 since the position of focal point F remains the same no matter what the extent of curvature of the concave mirror. In practice, this means that aquarium tank 21 may be constructed such that only a portion of back member 24 is mirrored, the condition critical for elimination of image distortion being placement of the front member such that the focal point F always occurs in a plane of the front member or outside the front member. However, from the standpoint of economy in manufacture, and the total appearance of the aquarium, it is preferred that substantially the entire area of back member 24 be mirrored.

The improved visual result afforded by the aquarium tank of the invention is illustrated in FIG. 5. By virtue of confinement of the objects of the aquarium between the focal point and the surface of the mirror, the images 39a, 39b, and 39c of fish 39 are distinguishable rather than elongated or otherwise distorted. The same result is noted for other objects in the tank, such as aquatic plants, stones and miniature constructions. Thus, the images are multiplied (depending upon the point from which the objects are viewed and the position of the objects relative to the focal point of the mirror), and simulation of depth together with regions of varying light are provided, but without the distortion resulting from the construction of the aquarium of the patent. Moreover, the construction of the bottom and end members together with the sealing means and materials of construction provides an aquarium tank of increased strength and improved appearance together with the advantages of increased resistance to soiling and corrosion.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In an aquarium tank, the combination of a bottom member, a back member comprising a concave mirror having a reflecting surface positioned to reflect into the interior of the tank and having a principal focal point, a front member for viewing objects within the tank, said front member being positioned relative to the focal point at a distance equal to or less than the distance of the principal focal point of the mirror from said reflecting surface so as to confine objects in the tank between the principal focal point of the mirror and the reflecting surface of the mirror, and end members connecting the vertical edges of said back member to said front member.

2. An aquarium tank according to claim 1 wherein the end members comprise a pair of posts having grooved surfaces for receiving the vertical edges of said back and front members.

3. An aquarium tank according to claim 1 including a top member connecting the top edges of said back, front and end members.

4. An aquarium tank according to claim 1 wherein the back member is a quarter cylinder concave mirror.

5. An aquarium tank according to claim 4 wherein the front member is plate glass.

6. An aquarium tank according to claim 1 wherein said bottom member is grooved to receive the bottom edges of said back, front and end members.

7. An aquarium tank according to claim 1 including water tight sealing means between the edges of said end members and the edges of said back, front and bottom members.

8. In an aquarium tank, the combination of:
a bottom member,
a back member comprising a concave mirror having a reflecting surface positioned to reflect into the interior of the tank and having a principal focal point,
a substantially uniplanar transparent front member positioned relative to the focal point at a distance equal to or less than the distance of the principal focal point of the mirror from said reflecting surface so as to confine objects in the tank between the principal focal point of the mirror and the reflecting surface of the mirror,
a pair of end member having grooved surfaces for receiving the vertical edges of said back and front members,
a top member connecting the top edges of said back, front and end members, and
water tight sealing means between the edges of said end members and the edges of said back, front and bottom members,
wherein said bottom member is grooved to receive the bottom edges of said back, front and end members.

9. An aquarium tank according to claim 8 wherein the back member is a quarter cylinder concave mirror.

10. An aquarium tank according to claim 8 wherein said end members are formed of aluminum alloy and said bottom and top members are formed of plastic.

* * * * *